(12) United States Patent
Vergis

(10) Patent No.: US 6,453,218 B1
(45) Date of Patent: Sep. 17, 2002

(54) INTEGRATED RAM THERMAL SENSOR

(75) Inventor: George Vergis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/280,913

(22) Filed: Mar. 29, 1999

(51) Int. Cl.$^7$ .............................................. G05D 23/00
(52) U.S. Cl. ........................... 700/299; 700/12; 700/21; 700/300; 700/278; 365/211; 365/212; 365/222; 374/175; 374/178; 374/100; 374/110
(58) Field of Search .............................. 700/12, 13, 14, 700/15, 16, 21, 299, 300, 278; 365/211, 212, 222, 149, 183; 374/178, 173, 172, 175, 100–110

(56) References Cited

U.S. PATENT DOCUMENTS

| 4,685,614 | A | * | 8/1987 | Levine ...................... 236/78 D |
| 4,854,731 | A | | 8/1989 | Jenkins |
| 4,858,377 | A | * | 8/1989 | Oglevee et al. ................. 47/17 |
| 5,154,514 | A | | 10/1992 | Gambino et al. ............ 374/178 |
| 5,213,416 | A | | 5/1993 | Neely et al. ................. 374/178 |
| 5,278,796 | A | * | 1/1994 | Tillinghast et al. .......... 365/211 |
| 5,285,418 | A | * | 2/1994 | Yamaguchi ................... 365/201 |
| 5,440,520 | A | * | 8/1995 | Schultz et al. ............... 365/226 |
| 5,451,892 | A | * | 9/1995 | Bailey ........................ 327/113 |
| 5,598,395 | A | * | 1/1997 | Watanabe .................... 369/116 |
| 5,619,430 | A | | 4/1997 | Nolan et al. ................. 365/222 |
| 5,639,163 | A | | 6/1997 | Davidson et al. ............ 374/178 |
| 5,784,328 | A | | 7/1998 | Irrinki et al. ................ 365/222 |
| 5,875,142 | A | * | 2/1999 | Chevallier ................... 365/212 |
| 5,886,504 | A | * | 3/1999 | Scott et al. .................... 322/15 |
| 9,021,076 | | * | 2/2000 | Woo et al. .................... 365/211 |
| 6,285,707 | B1 | * | 9/2001 | Giles et al. .................. 375/222 |
| 2001/0014049 | A1 | * | 8/2001 | Woo et al. .................... 365/211 |

* cited by examiner

Primary Examiner—Ramesh Patel
(74) Attorney, Agent, or Firm—Kenyon & Kenyon

(57) ABSTRACT

A method and apparatus for the thermal sensing and regulating of a RAM device using temperature sensing circuitry, embedded directly in the device, is presented. A predetermined voltage is passed through a temperature sensitive diode to create an analog signal. The analog signal is converted into digital temperature data by a A/D converter. The digital temperature data is then transmitted to a controlling host, without interfering with the normal operation of the device, by either transmitting the data in an out-of-band signal or during the clock refresh cycle. The controlling host, upon receipt of the temperature data, checks to see if the temperature level of the device has exceeded a threshold value.

19 Claims, 3 Drawing Sheets

INTEGRATED RAM THERMAL SENSOR

FIELD OF THE INVENTION

The present invention relates to a method and apparatus for an integrated RAM thermal sensor and, more particularly, to a method and apparatus for thermal sensing and regulating in RAM devices.

BACKGROUND INFORMATION

As the frequency of access to a device increases, the device generates heat. The heat generated has to be removed from the device to guarantee data integrity and long term device reliability.

Attempts have been made to address the heating problems. For example, external thermal sensors to detect when the device gets too hot and accordingly suspend or slow down access have been used. Separate chips or circuits that act as a thermal sensor have been used to detect the temperature of the RAM device but several problems exist with this approach. One problem is that the sensor will typically be several generations of technology behind the more frequently updated RAM devices and other chips on the motherboard. This usually means that the more modern chips are operating at a lower voltage. Therefore, the thermal sensor will need a separate voltage feed, apart from the other chips, which is cumbersome, especially when the trend is towards miniaturization. Another problem is that the external sensor is much less accurate because it is measuring the temperature through a medium connected to or touching the device being measured. Typical mediums can be a wire or a metallic plate. The medium has some resistance and accordingly the heat will dissipate to some degree before being measured. Finally, by having external circuitry for temperature sensing along with interconnections to and from the circuitry, additional failure points are introduced into the system. For example, the IC housing the external sensor may come lose from its socket while the memory device may be fine. These problems may prevent an external temperature sensor from adequately protecting the RAM devices from overheating.

Another approach known in the field has been to implement a counter, usually external to the RAM device, which keeps track of the number of accesses within a certain time period. If the number exceeds a certain threshold then it is assumed that the device is nearing its heat limit. One problem with this approach is that the initial condition for the temperature must be assumed. For example, if someone left a laptop computer in a parked car on a hot day, the starting temperature will be much higher than normal. Therefore, the counter will not work properly because it will still assume the device can handle the same number of accesses as if it started at a normal temperature. Another problem is that the temperature is dependent on other variables aside from the data access frequency. One such variable is the type of chassis. Therefore, this mechanism must be used in light of the worst-case scenario of chassis heating, which will often yield erroneous temperature readings.

SUMMARY OF THE INVENTION

According to an embodiment of the present invention, a method and apparatus for thermal sensing and regulating in a RAM device is provided. An analog signal is created by passing a predetermined voltage through a temperature sensitive diode embedded in the RAM device. The analog signal is converted to digital temperature data, and the digital temperature data-is then transmited to a controller host capable of regulating an access rate of the RAM device.

DETAILED DESCRIPTION

Figure 1:
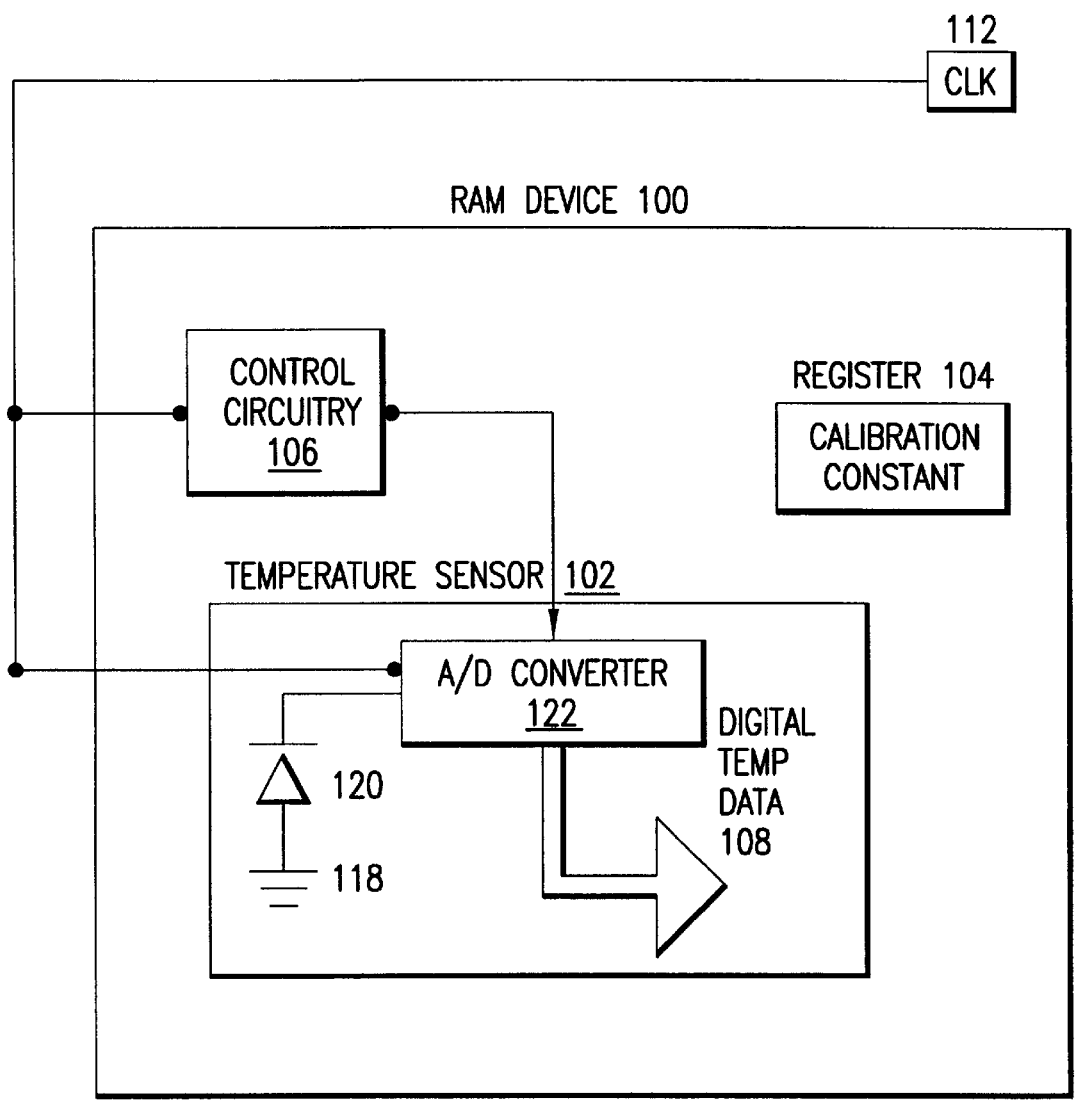
FIG. 1 illustrates a temperature sensing mechanism for use in the RAM device composed of a temperature sensitive diode and an analog to digital converter, according to an embodiment of the present invention.
Figure 2:
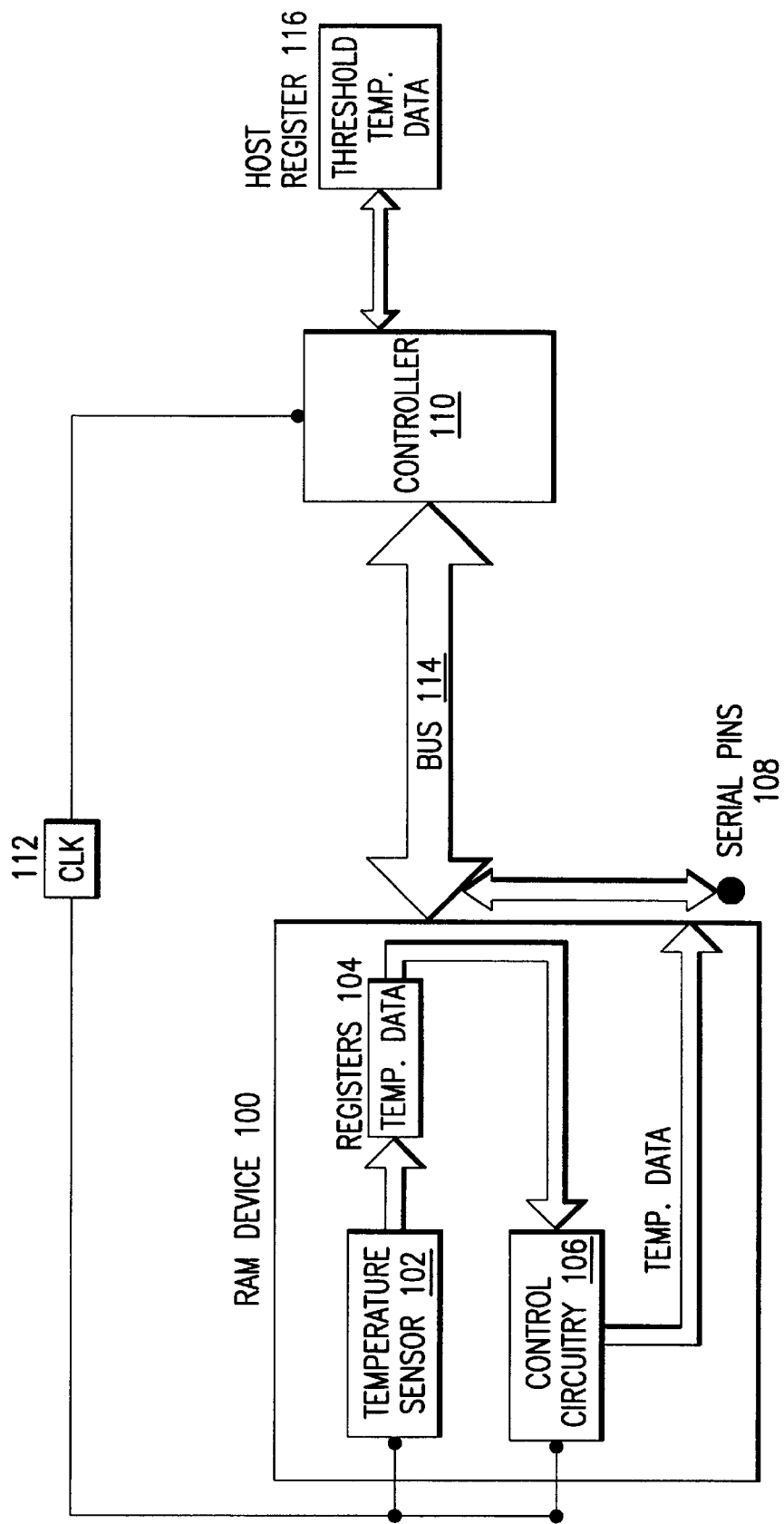
FIG. 2 illustrates a mechanism for sensing temperature within a RAM device and transmitting the temperature data to the host using signals which are out-of-band and will not interfere with the normal memory data being transmitted in the same clock cycle, according to an embodiment of the present invention.
Figure 3:
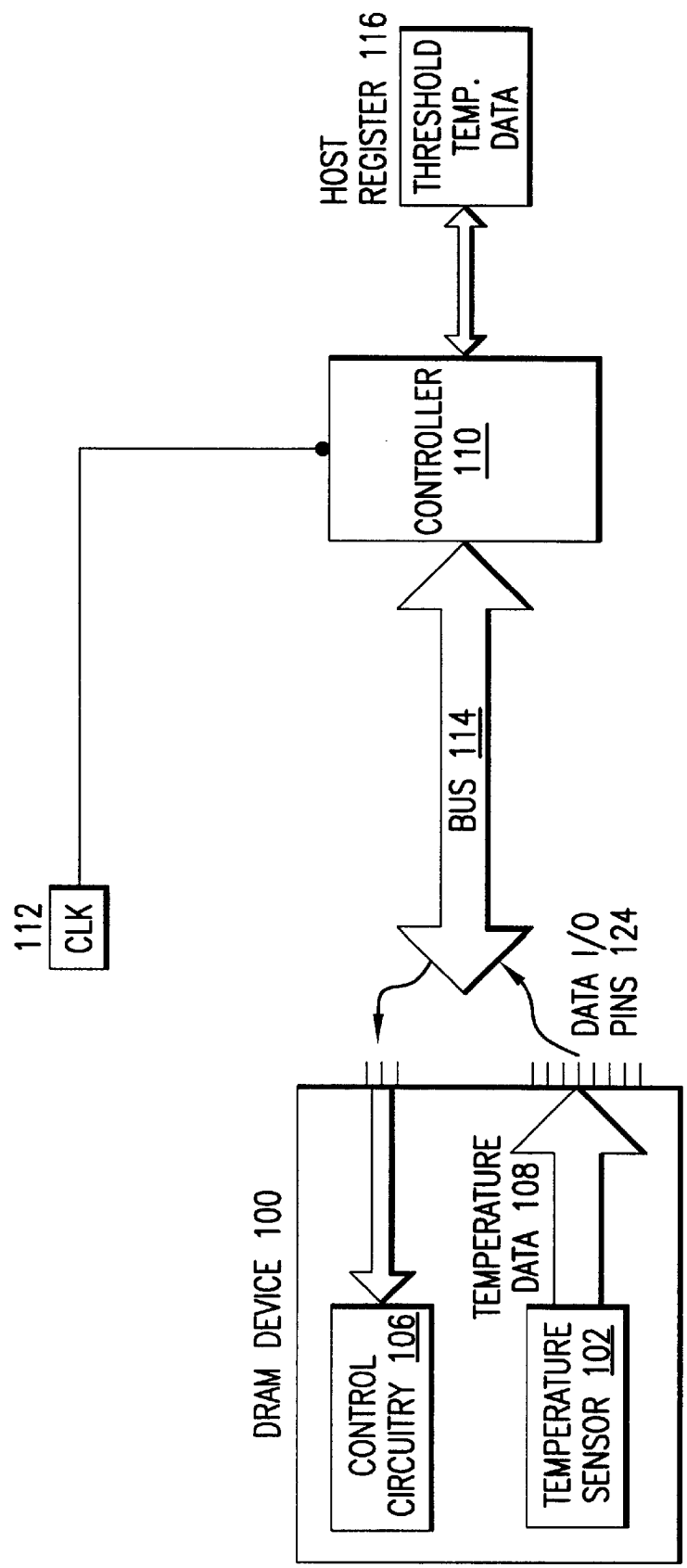
FIG. 3 illustrates a mechanism for sensing temperature within a DRAM device by transmitting the temperature data from the temperature sensor over the data pins during the current refresh cycle of the DRAM device, according to an embodiment of the present invention.

FIGS. 1 through 3 illustrate a method and apparatus for integrating a thermal sensor for temperature sensing and regulating in RAM, DRAM and RDRAM devices.

Referring to FIG. 1, a temperature sensor small enough to be embedded into a device is illustrated by temperature sensor 102 within the RAM device 100. A power source 118, which originates outside and enters the RAM device 100 through one of the pins, is responsible for sending a predetermined voltage through the temperature sensitive diode 120. The temperature sensitive diode produces a change in the current proportional to the temperature. For instance, as the temperature increases the current passing through the diode 120 decreases. As such, the A/D converter 122 also, of course, incorporates inversion and scaling circuitry (not shown). The analog signal containing temperature data sent from the diode 120 to the A/D converter 122 is converted to digital data. The digital temperature data 108 that is thus transmitted from the A/D converter 122 should be accurate to within a + or −3 degrees Celsius of the device temperature. This temperature variation is due to intrinsic characteristics of the temperature sensitive diode 120 itself. In order to reduce the variation, a calibration constant (discussed in further detail below) can be used. For operation of the temperature sensor 102, the clock signal 112 can be directly interfaced with the A/D converter 122 and every N clock cycles (N being a reasonable number of clock cycles since the temperature need not be checked every clock cycle) the temperature data 108 will be transmitted, or the control circuitry 106 within the RAM device can cause the A/D converter 122 to transmit the temperature data 108.

When using this type of sensor, it may be desirable, in certain implementations, to have a very high degree of accuracy for the temperature readings obtained from the temperature sensor. To achieve an accuracy greater than + or −3 degrees Celsius, it will be necessary to have a calibration constant (as mentioned above) since each diode has inherent characteristics. The calibration constant can either be stored in a memory location within the RAM device, in one of the RAM device's registers 104, or in one of the host's registers external to the RAM device. While there are many ways to calibrate the results of the measurement of the current flowing through the temperature sensitive diode, one way is to have the calibration constant simply represent the offset in degrees Celsius. In this case, the calibration constant can be summed with the temperature data from the diode to achieve the more accurate temperature reading. The calibration constant is set in the factory where the diode can be tested against known parameters to determine its internal characteristics.

By directly embedding a temperature sensing mechanism, as, for example, described above according to an embodiment of the present invention, there are many alternatives which can be used to implement transmission of temperature data generated by the internally embedded sensor to the Controller host. Two of these alternatives will be described in the following paragraphs:

ALTERNATIVE 1

Referring to FIG. 2, temperature data generated by the internal temperature sensor is periodically written to a specific register within the RAM device. As such, RAM device 100 includes in addition to temperature sensor 102 and control circuitry 106, a register area 104 for storing data, and serial pins 108 which are connected to a bus 114. There are, of course, a number of other components, such as a memory array, which are not shown or discussed. The frequency of the register update is based on a reasonable subdivision of the clock signal (CLK). The clock signal CLK 112 is thus divided by a number N (known by both the RAM device and the host controller), and the temperature sensor 102 checks and transmits the temperature to the register 104 once for every resulting period based on this subdivision of the clock signal (CLK/N). The same clock cycle (CLK/N) also causes the RAM device's control circuitry 106 to transmit the data from the temperature register 104 to the bus 114 over the serial pins 108. The Controller 110 retrieves the temperature data from the system bus 114. This same clock signal, i.e. CLK, is used by the rest of the circuitry within both the RAM device and the Controller. For example, if the clock signal CLK is 100 MHZ and it is determined that the temperature check can safely occur 1/sec (or 1 Hz) then we will divide the clock signal by 1,000,000 (known as N) yielding a CLK/N of 1 Hz. The constant value of N will be known by both the RAM device and the host so when the RAM device starts transmitting temperature data, the host will know when to start receiving it. The temperature data in the register is then transmitted out of the RAM device via one or more of the pins on the memory device.

Memory devices normally have serial pins which transmit what is commonly known as out-of-band data. This means that the normal data and address information sent in and out of the memory device can continue to operate uninhibited in the same clock cycles as the information being transmitted through the out-of-band signals. So when the temperature data is transmitted over the serial pin(s) it will not interfere with the normal data cycle by leaving the pins needed for addressing and normal memory data I/O free.

Since the temperature data may be larger than the number of bits that can be transmitted over the serial pins 108 in one clock cycle, the data may be broken up into a number of packets and accordingly transmitted over the serial pin(s) in successive clock cycles, starting from the clock cycle CLK/N. For example, if only two serial pins 108 are available and the temperature data requires 16 bits, the data will be broken into eight 2-bit packets. The packets are then transmitted over the serial pins, 1 packet per clock cycle. Note that if the data is in packets, the Controller 110 will know to retrieve all the packets in successive clock cycles then assemble them. In this manner, the Controller will read the temperature data and compare it to a stored maximum temperature threshold value to determine if the device is overheating and, if so, take the appropriate steps to suspend or slow down access to the RAM device. Since the host and the RAM device are coordinating based on the clock signal divided by a reasonable number CLK/N, it is not necessary to have another command to initiate a temperature check from the host side.

A host register is used to store the maximum allowable threshold temperature 116 (alternatively it could be stored in a register within the RAM device). This maximum temperature is set outside the normal operation of the temperature sensor in the RAM device and can either be inserted into the Controller 110 or preprogrammed into the RAM device 100. The Controller 110 reads the maximum temperature threshold out of the system register 116. The Controller 110 then compares the temperature data with the maximum temperature threshold, and if the temperature is at or above the threshold, the host will know that the device is overheating and either discontinue access to the device or allow only limited access. The Controller 110 will then check the temperature again at the next subdivision of the clock signal 112, and if the temperature has lowered to below the threshold, it will resume normal access to the RAM device 100.

ALTERNATIVE 2

Referring to FIG. 3, and in this alternative, temperature data generated by the internal temperature sensor is not stored within a register, but instead transmitted directly out of the device on the pins normally used for sending and receiving memory data. Transmission of the temperature data is done during the current refresh cycle of the device because the data pins are idle at this point. As before, DRAM device 100 includes temperature sensor 102 and control circuitry 106, however, in this alternative embodiment data I/O (input/output) pins 124 are connected to bus 114. When a certain command is transmitted to the DRAM 100, it initiates a current refresh/ temperature check cycle by sending a signal over the bus 114 which prompts the DRAM's control circuitry 106 to initiate the cycle. The control circuitry 106 immediately signals the temperature sensor 102, which sends the temperature data 108 directly to the data I/O pins 124 of the DRAM device. For example, if 8 bits are needed to carry the temperature data, the 8 pins normally used to transmit memory data would instead be used to transmit the temperature data. The Controller 110 retrieves the temperature data from the bus 114. If there are not enough memory data pins to transmit all the temperature data in one clock cycle then the temperature data can be staged over 2 or more clock cycles. For example, if 16 bits are needed to transmit the temperature data but only 8 memory data pins are available, then the data can be transmitted in two clock cycles, 8 bits in each cycle. If the data is in packets, the Controller 110 will know to retrieve all the packets in successive clock cycles before assembling them.

Once the Controller reads the temperature data it will compare the data with a pre-determined threshold temperature stored in a register. A host register is used to store the maximum allowable threshold temperature 116, or alternatively, it could be stored in a register within the RAM device. If the temperature data is at or above the threshold, the host controller can then take appropriate steps to suspend or slow down access to the DRAM device. This maximum temperature is set outside the normal operation of the RAM device and can either be inserted into the Controller 110 or preprogrammed into the RAM device 100. The Controller 110 reads the maximum temperature threshold out of the system register 116. The Controller 110 then compares the temperature data with the maximum temperature threshold and if the temperature is at or above the threshold then the host will know that the device is overheating and either discontinue access to the device or only allow limited access. The Controller 110 will then check the temperature again the next time a temperature check is initiated and if the temperature has come down below the threshold it will resume normal access to the DRAM device 100.

In this method, since the host must initiate a temperature read, either a new op-code representing both the current refresh and the temperature read can be added (in addition to the existing op-code which tells the host to initiate just a current refresh for a particular DRAM device) or the temperature check can just automatically be part of the current refresh cycle (often referred to as piggy backing) to eliminate the need to add a new op-code.

As shown above, an advantage of the present invention is that it can be used to transmit data of any bit length. For example, an advantageous method of transmitting temperature data is to encode it in a 16 bit frame along with the address of the RAM device, the offset value (calibration constant), and the packet framing bits. As such, the two alternatives above would simply need to be adapted to a 16 bit temperature data frame. If, however, only 8 pins were available to transmit temperature data during the current refresh cycle method discussed above, then two clock cycles would be required to transmit all the temperature data to the host. The reason the address data of the RAM device is included in the 16 bit frame is that since all the data from the normal data pins of the RAM device are being put on the system bus, the host may not know the device from which the temperature data is coming. By including the device's address, the host will know which RAM device it should regulate if so needed. In this method the host would then need to sum the temperature data with the offset value. Another method could be to sum the temperature data and the offset value within the RAM device before either storing or transmitting the temperature data.

One type of new high speed RAM device that can experience overheating is the Rambus DRAM (or RDRAM). The present invention described herein can easily be adapted to work with an RDRAM for either of the two alternative methods of temperature transmission as described above. In both methods, of course, a temperature sensor is embedded into the RDRAM and will generate temperature data.

For the first method, the data is generated at regular intervals which are subdivisions of the normal clock signal (CLK/N). The data is stored in a register inside the RDRAM then transmitted to the host via the CMOS pins of the RDRAM known as SIO0 and SIO1 (serial input/output pins 0 and 1). These are serial, out-of-band, pins so the temperature data transmission will not interfere with the normal memory data being transmitted during the same clock cycle. Since there are only two serial pins available, the temperature data may need to be staged over several successive clock cycles. For example, if the 16 bit temperature data frame described above is used, it will be necessary to transmit the data over 8 successive clock cycles.

For the second method, an RDRAM has something known as the current calibration cycle which, among other things, refreshes the current in the cells of the memory, and so it is very similar to the refresh cycle outlined above. The pins used to transmit the current refresh data are DQA[5,3] and DQB[5,3]. This leaves the remaining data pins of the RDRAM available for transmitting temperature data. As such, temperature data is transmitted over the DQA[1,2,6,7] and DQB[1,2,6,7] pins in the RDRAM. If the 16 bit temperature data frame previously mentioned is used, then two successive clock cycles will be needed to transmit all the temperature data. In order to invoke this method the host must initiate the process so it can either be combined with the commands initiated by the current calibration command in the XOP field (op-code) or a new value in the XOP field can indicate that this is a special type of current calibration which also does a temperature check, so the host will know to look for the temperature data on the memory data pins.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method for thermal sensing and regulating in a RAM device, the method comprising the steps of:

creating an analog signal by passing a predetermined voltage through a temperature sensitive diode embedded in the RAM device;

converting the analog signal to a digital temperature data; and transmitting the digital temperature data to a host capable of regulating an access rate of the RAM device.

2. The method of claim 1, further comprising the step of:

storing the digital temperature data in a register.

3. The method of claim 1, further comprising the step of:

generating a clock signal, wherein the digital temperature data is transmitted on the basis of the clock signal.

4. The method of claim 3, wherein transmission is accomplished during the clock refresh cycle.

5. The method of claim 1, wherein transmission of the digital temperature data is accomplished by an out-of-band signal.

6. The method of claim 1, wherein transmission of the digital temperature data is via a pair of CMOS pins.

7. The method of claim 1, wherein transmission of the digital temperature data is via a plurality of pins, the plurality of pins not being used to transmit a clock refresh signal.

8. The method of claim 1, wherein the host is adaptively configured to regulate the access rate of the RAM device based on the digital temperature data.

9. An apparatus for thermal sensing and regulating in a RAM device, the apparatus comprising:

a temperature sensitive diode, embedded in the RAM device, to generate an analog signal reflecting the temperature of the RAM device;

an A/D converter, embedded in the RAM device and coupled to the temperature sensitive diode, to convert the analog signal to digital temperature data; and a controller host, coupled to the RAM device, to receive the temperature data and control a rate of access to the RAM device on the basis of the temperature data.

10. The apparatus of claim 9, further comprising:
a control circuit which can retrieve the temperature data and send it to the controller host.

11. The apparatus of claim 9, further comprising a clock having a clock signal coupled to the RAM device, wherein the digital temperature data is generated and transmitted to the controller host based on the clock signal.

12. The apparatus of claim 9, wherein the temperature sensitive diode generates the analog signal based on a predetermined voltage from a power supply external to the RAM device.

13. The apparatus according to claim 9, further comprising:
a register, in which the temperature data can be stored.

14. The apparatus according to claim 9, further comprising:
at least one serial pin on the RAM device through which transmission of the temperature data takes place.

15. The apparatus according to claim 9, further comprising:
a bus connecting the RAM device to the Controller host.

16. The apparatus according to claim 9, wherein the temperature data is sent in an out-of-band signal so as not to interfere with the normal operation of the RAM device.

17. The apparatus according to claim 9, wherein the temperature data is sent during a clock refresh cycle so as not to interfere with the normal operation of the RAM device.

18. The apparatus of claim 9, wherein transmission of the temperature data is via a pair of CMOS pins.

19. The apparatus of claim 9, wherein transmission of the temperature data is via a plurality of pins, the plurality of pins not being used to transmit a clock refresh signal.

* * * * *